United States Patent [19]

Shimizu

[11] Patent Number: 4,526,330
[45] Date of Patent: Jul. 2, 1985

[54] TAPE CASSETTE HAVING REMOVABLE REELS

[75] Inventor: Tokuzo Shimizu, Tokyo, Japan

[73] Assignee: Teac Corporation, Tokyo, Japan

[21] Appl. No.: 610,629

[22] Filed: May 16, 1984

[30] Foreign Application Priority Data

| May 17, 1983 | [JP] | Japan | 58-72551[U] |
| May 20, 1983 | [JP] | Japan | 58-76469[U] |
| Oct. 13, 1983 | [JP] | Japan | 58-158474[U] |
| Dec. 16, 1983 | [JP] | Japan | 58-193750[U] |

[51] Int. Cl.³ .............................................. G03B 1/04
[52] U.S. Cl. .................................................... 242/199
[58] Field of Search ............. 242/199, 195, 198, 200, 242/197; 206/387

[56] References Cited

U.S. PATENT DOCUMENTS

| 3,495,787 | 2/1970 | Wallace | 242/199 |
| 3,701,495 | 10/1972 | Holliday | 242/199 X |
| 4,200,250 | 4/1980 | Fischer et al. | 242/199 |
| 4,249,710 | 2/1981 | Dobbs et al. | 242/199 |
| 4,368,860 | 1/1983 | Goto | 242/199 |
| 4,386,746 | 6/1983 | Okamura | 242/199 |
| 4,410,149 | 10/1983 | Armstrong | 242/200 |
| 4,418,373 | 11/1983 | Fujimori et al. | 242/199 X |
| 4,485,990 | 12/1984 | Ogiro | 242/199 |

Primary Examiner—Stephen Marcus
Assistant Examiner—Leo J. Peters
Attorney, Agent, or Firm—Michael N. Meller

[57] ABSTRACT

A tape cassette comprises a cassette case having a front opening located on the front thereof for allowing a tape to enter within the cassette case and a side opening located on at least one side of the cassette case, a pair of reels for winding the tape thereon, and a pair of support parts located displaceably on the cassette case, for rotatably supporting the reels which are inserted into the cassette case through the side opening. The reels are removable from the cassette case through the side opening. The support parts are displaced to disengage the support with respect to the reels which are being removed from the cassette case.

10 Claims, 25 Drawing Figures

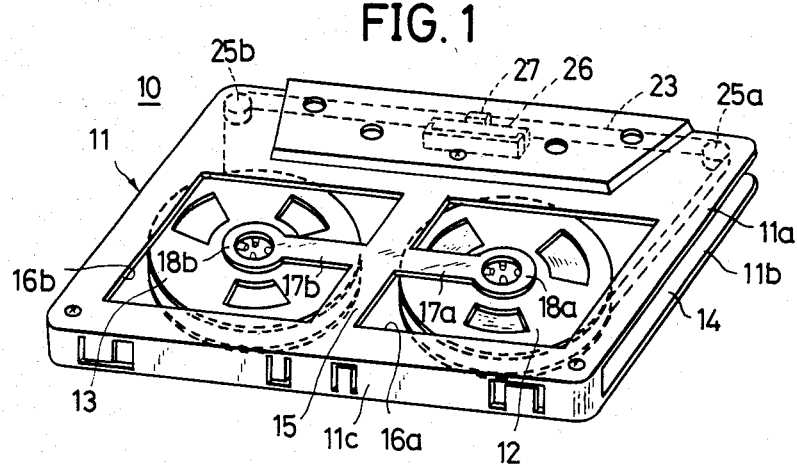
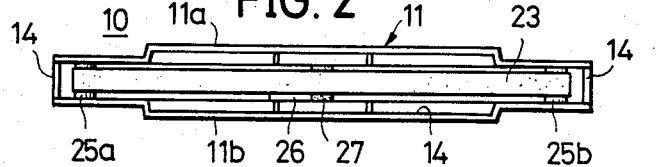
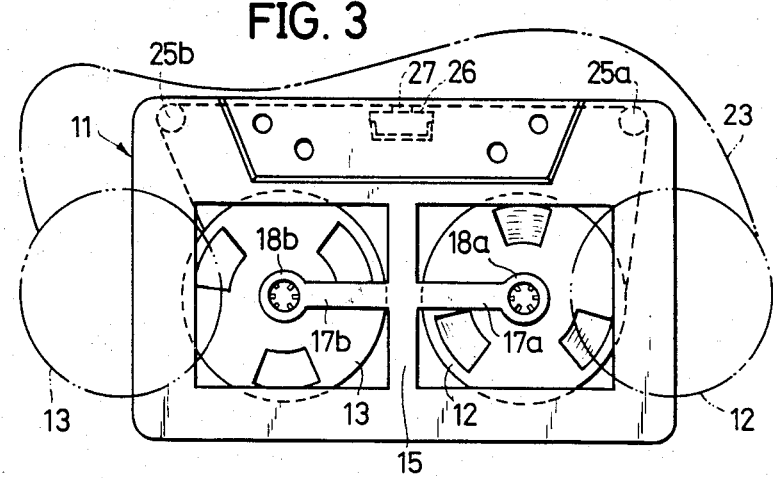
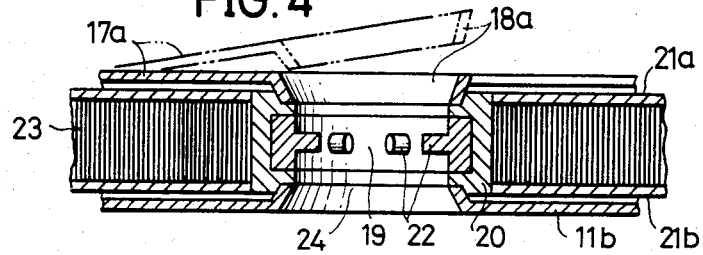

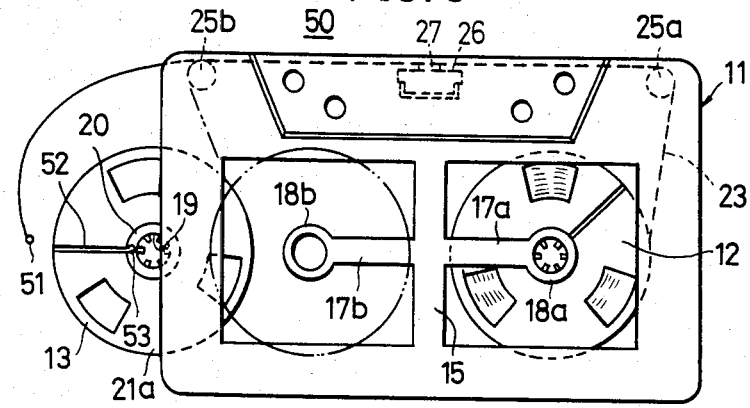
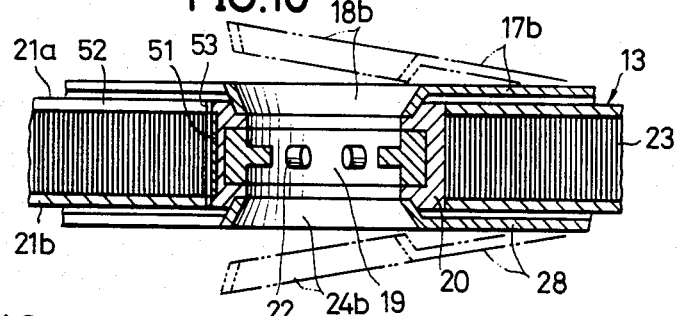
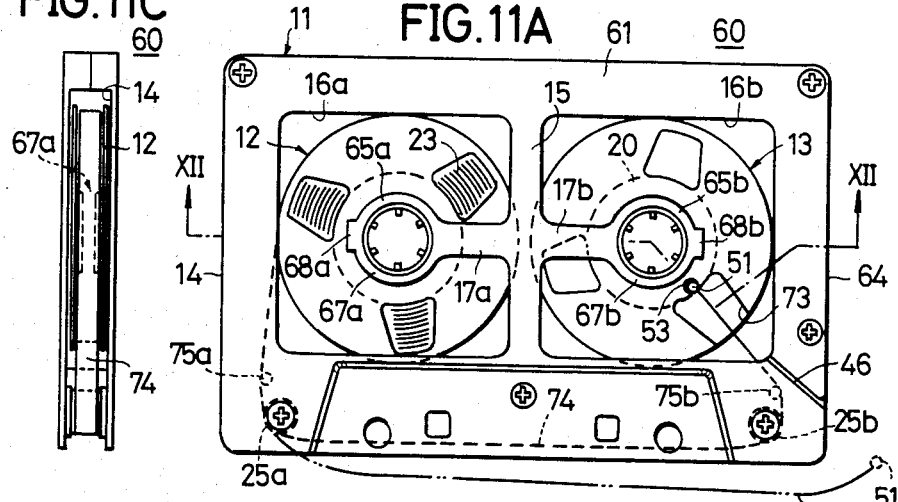

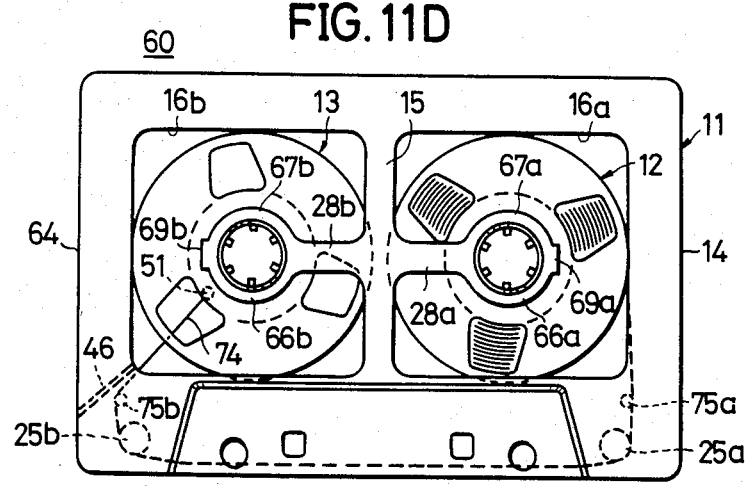
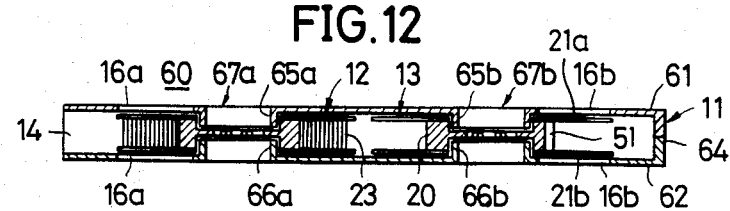
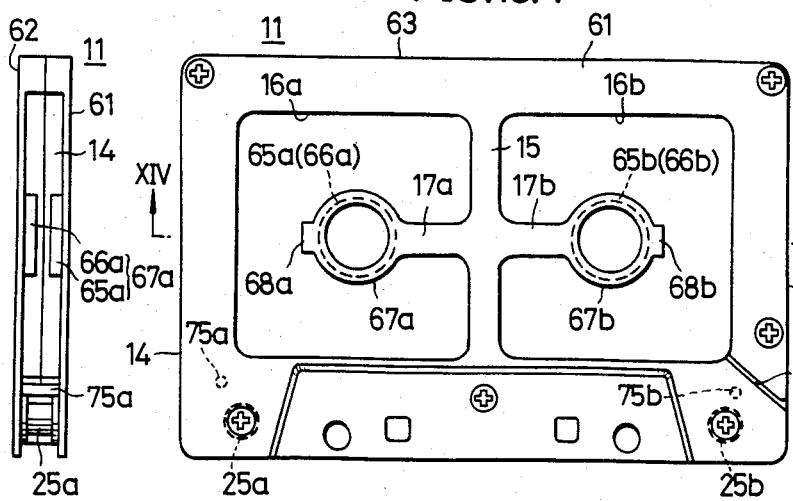

TAPE CASSETTE HAVING REMOVABLE REELS

BACKGROUND OF THE INVENTION

The present invention generally relates to tape cassettes, and more particularly to a tape cassette which is designed so that at least one reel is removably accommodated within a cassette case of the tape cassette.

In the conventional tape cassette, a pair of reel hubs (or spools) are accommodated within a cassette case of the tape cassette. Leader tapes which are connected to both ends of a magnetic tape, are fixed to the respective reel hubs, and the magnetic tape is wound around these reel hubs. In the conventional tape cassette, the reel hubs, the magnetic tape, and the like, are permanently accommodated within the cassette case. In other words, the conventional tape cassette is designed so that the reel hubs, the magnetic tape, and the like, cannot be removed from the cassette case.

For this reason, one tape cassette was conventionally required to carry out a recording or a reproduction with respect to one reel of tape. The tape cassette itself is relatively small compared to the reel-to-reel type, however, when the user wanted to keep a certain number of reels of tape, the user had to keep the same number of tape cassettes. As a result, it took up a large space to keep a large number of tape cassettes, and there was a problem in that it was difficult for the user to carry a large number of tape cassettes at one time.

Although the pair of reel hubs are accommodated within the tape cassette, these reel hubs are used when the tape cassette is loaded into a tape recorder and the magnetic tape wound on one of the reel hubs is taken up by the other reel hub. Accordingly, when the tape cassette is to be kept in a state where all of the magnetic tape is wound on one of the reel hubs, the other empty reel hub which has no magnetic tape wound thereon is unnecessary.

The present invention was made by noting the problem described before and the fact that the empty reel hub is unnecessary when keeping the tape cassette in the state where all of the magnetic tape is wound on one of the reel hubs.

SUMMARY OF THE INVENTION

Accordingly, it is a general object of the present invention to provide a novel and useful tape cassette which has solved the problem described heretofore.

Another and more specific object of the present invention is to provide a tape cassette which is designed so that at least one reel is removably accommodated within a cassette case of the tape cassette. When keeping $N$ reels of tape, where $N$ is an arbitrary integer, it was conventionally necessary to keep $N$ tape cassettes each accommodating a pair of reel hubs and a magnetic tape. However, according to the tape cassette of the present invention, it is only necessary to keep one tape cassette accommodating a pair of reel hubs and a magnetic tape, and (N-1) reel hubs each having the magnetic tape wound thereon. Hence, the space required to keep one tape cassette and (N-1) reel hubs according to the present invention, is considerably small compared to the space required to keep $N$ conventional tape cassettes. The space required to keep one tape cassette and (N-1) reel hubs according to the present invention, is approximately one half the space required to keep $N$ conventional tape cassettes. Further, since it takes up less space to keep one tape cassette and (N-1) reel hubs, it becomes easier to carry them. This effect of the present invention becomes more notable as the number of reels of tape which are to be kept increases. In addition, it is only necessary to keep one tape cassette according to the present invention, and the user only needs to buy the magnetic tapes in order to enlarge his collection of tapes. As a result, it becomes possible to enlarge the collection of tapes at a minimum cost.

Other objects and further features of the present invention will be apparent from the following detailed description when read in conjunction with the accompanying drawings.

BRIEF DESCRIPTION OF THE DRAWINGS

FIG. 1 is a rear perspective view showing a first embodiment of a tape cassette according to the present invention;

FIG. 2 is a front view of the tape cassette shown in FIG. 1;

FIG. 3 is a plan view for explaining the insertion and removal of reels into and from a cassette case of the tape cassette shown in FIG. 1;

FIG. 4 is a view in cross section showing a reel support part of the tape cassette shown in FIG. 1;

FIG. 9 is a plan view for explaining the insertion and removal of reels into and from a cassette case of the tape cassette shown in FIG. 8;

FIG. 10 is a view in cross section showing a reel support part of the tape cassette shown in FIG. 8;

FIGS. 11A through 11D respectively are a plan view, a front view, a side view, and a bottom view of a fifth embodiment of a tape cassette according to the present invention;

FIG. 12 is a view in cross section along a line XII—XII in FIG. 11A;

FIGS. 13A through 13E respectively are a plan view, a right side view, a left side view, a front view, and a rear view of a cassette case of the tape cassette shown in FIG. 11;

DETAILED DESCRIPTION

Figure 5:
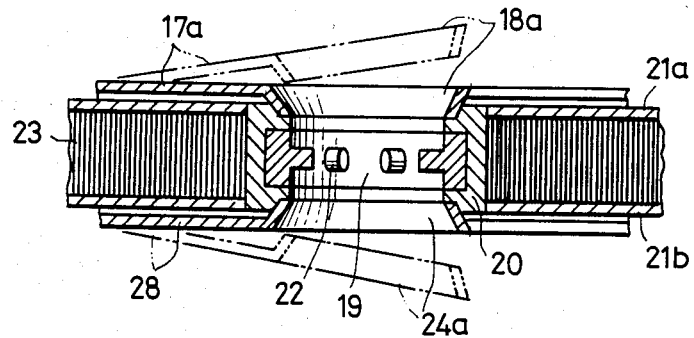
FIG. 5 shows another embodiment of a reel support part shown in FIG. 4.

First, description will be given with respect to a first embodiment of a tape cassette according to the present invention by referring to FIGS. 1 through 5. A tape cassette 10 generally comprises a cassette case 11 and a pair of tape reels 12 and 13. The external size and shape of the cassette case 11, are the same as those of the cassette case of the existing compact type tape cassette.

The cassette case 11 comprises a pair of plate parts 11a and 11b, and a rear wall part 11c. An opening 14 is formed along both sides and the front of the cassette case 11. A pair of openings 16a, and 16b which are partitioned by a central bridge 15, are formed in the plate part 11a of the cassette case 11. Arms 17a and 17b are integrally formed on the bridge 15, and project into the respective openings 16a and 16b. Reel support parts 18a and 18b are formed on respective tip ends of the arms 17a and 17b. The cassette case 11 is made of a plastic, and the arms 17a and 17b are flexible. In the drawings, the cassette case 11 is illustrated as if the cassette case 11 is made of a transparent plastic, however, the cassette case 11 may of course be made of an opaque plastic.

As shown in FIG. 4, the reel 12 comprises a reel hub 20 having a center hole 19 for receiving a reel driving shaft of a recording and/or reproducing apparatus, and reel flanges 21a and 21b. Projections 22 which engage with the reel driving shaft, are located on the reel hub 20 so as to project into the center hole 19. A magnetic tape 23 is wound around the reel hub 20, between the reel flanges 21a and 21b. The reel 13 has the same construction as the reel 12. The support part 18a (18b) has a projecting portion which engages with the center hole 19 of the reel hub 20. A support part 24 which engages with the center hole of the reel hub 20, is formed on the plate part 11b at a position opposing the support part 18a (18b). The support parts 18a, 18b, and 24 each have a hole into which the reel driving shaft is inserted.

Similarly as in the case of the existing compact type tape cassette, a pair of guide rollers 25a and 25b, and a pad 27 which is supported on a leaf spring 26, are respectively provided at the front of the cassette case 11.

Next, description will be given with respect to the operation by which the reels 12 and 13 are inserted into and removed from the cassette case 11. First, when inserting the reel 12 into the empty cassette case 11, the reel 12 is inserted through the opening 14 on the right of the cassette case in FIG. 3, as indicated by a two-dot chain line in FIG. 3. The reel 12 is thus inserted into the cassette case 11, within a space formed between the plate parts 11a and 11b. Then, the arm 17a is bent upwardly so as to raise the support part 18a as shown in FIG. 4, and the reel 12 is inserted up to the position indicated by a solid line in FIG. 3. When the reel 12 reaches the position indicated by the solid line in FIG. 3, the center hole 19 of the reel hub 20 engages the support part 24 of the plate part 11b. In addition, the arm 17a resiliently returns to its original state, and the center hole 19 of the reel hub 20 also engages the support part 18a. In this state, the reel 12 is rotatably supported by the support part 18a and the support part 24. Next, the magnetic tape 23 is manually guided along the front of the cassette case 11, and the reel 13 is inserted through the opening 14 on the left of the cassette case 11 in FIG. 3. The reel 13 is thus inserted into the cassette case 11, within a space between the plate parts 11a and 11b. Then, by performing operations similar to those performed with respect to the reel 12, the reel 13 is inserted up to the position indicated by a solid line in FIG. 3. In other words, the support part 18b is raised by bending the arm 17b upwardly, so that the reel 13 can reach the predetermined position indicated by the solid line in FIG. 3. In this state, the reel 13 is rotatably supported by the support parts 18b and 24 (this support part which is formed on the plate part 11b and opposes the reel support part 18b, is not shown in the drawings).

The reel 12 and/or the reel 13 are rotated in respective directions so as to take up the slack in the magnetic tape 23. When the magnetic tape 23 extending outside the cassette case 11 is taken up by the reel 12 and/or reel 13, the magnetic tape 23 enters within the cassette case 11 from the opening 14 at both sides and the front of the cassette case 11. As a result, a predetermined tape path shown in FIGS. 1 and 3 is formed. In this predetermined tape path, the magnetic tape 23 from the reel 12 is guided by the guide roller 25a, passes by the pad 27, is guided by the guide roller 25b, and reaches the other reel 13. The tape cassette 10 in this state, can be played on a cassette tape recorder in exactly the same manner as when the existing compact type tape cassette is played.

When removing the reels 12 and 13 from the cassette case 11, the operations described before are performed in the reverse sequence. In other words, the arms 17a and 17b are bent upwardly so as to raise the respective support parts 18a and 18b so as to disengage the support parts 18a and 24 from the center hole 19 in the reel hub 20 of the reel 12, and disengage the support parts 18b and 24 from the center hole 19 in the hub 20 of the reel 13, and the reels 12 and 13 are respectively removed from the cassette case 11 through the opening 14 on the right and left of the casette case 11 shown in FIG. 3. The magnetic tape 23 is removed from the cassette case 11 through the opening 14 on both sides and the front of the cassette case 11. Another pre-recorded magnetic tape or an unrecorded magnetic tape may be inserted into the empty cassette case 11, by performing operations which are exactly the same as those described before.

In the first embodiment described heretofore, the support parts 24 are integrally formed on the plate part 11b. However, the construction of the support parts 24 is not limited to that employed in the first embodiment. For example, the plate part 11b may be shaped exactly the same as the plate part 11a. In other words, a pair of openings which are partitioned by a central bridge may be formed in the plate part 11b of the cassette case 11, arms may be integrally formed on the bridge so as to project into the respective openings, and the support parts 24 may be formed on respective tip ends of the arms. In this case, a support part 24a which opposes the support part 18a, is formed on a flexible arm 28, and the support part 24a can therefore be lowered as shown in FIG. 5. Thus, the reels 12 and 13 can be inserted into and removed from the cassette case 11 with more ease compared to the case where only the support parts 18a and 18b can be raised.

Figure 6:
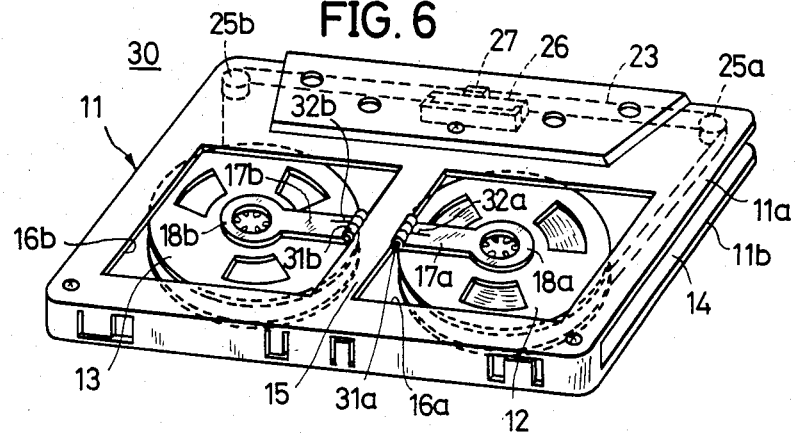
FIG. 6 is a rear perspective view showing a second embodiment of a tape cassette according to the present invention.

Next, description will be given with respect to a second embodiment of a tape cassette according to the present invention by referring to FIG. 6. In FIG. 6, those parts which are the same as those corresponding parts in FIG. 1 are designated by the same reference numerals, and their description will be omitted. In a tape cassette 30 shown in FIG. 6, the opening 14 is formed on both sides and the front of the cassette case 11. The central bridge 15 partitions the openings 16a and 16b in the plate part 11a. Base ends of the arms 17a and 17b which integrally have the respective support parts 18a and 18b, are pivotally supported on the bridge 15 by respective pivot supports 31a and 31b. The pivot supports 31a and 31b are loaded with respective springs 32a and 32b. These springs 32a and 32b urge the respective arms 17a and 17b to rotate in directions which engage the support parts 18a and 18b with the center holes in the hubs of the respective reels 12 and 13.

According to this second embodiment, the support parts 18a and 18b are raised not by flexing the arms 17a and 17b, but by rotating the arms 17a and 17b about the respective pivot supports 31a and 31b. For this reason, the arms 17a and 17b will be prevented from breaking due to excess bending of the arms 17a and 17b. Operations of inserting and removing the reels 12 and 13 into and from the cassette case 11 may be readily understood from the description given before in conjunction with the first embodiment, and description of these operations will be omitted.

Figure 7A:
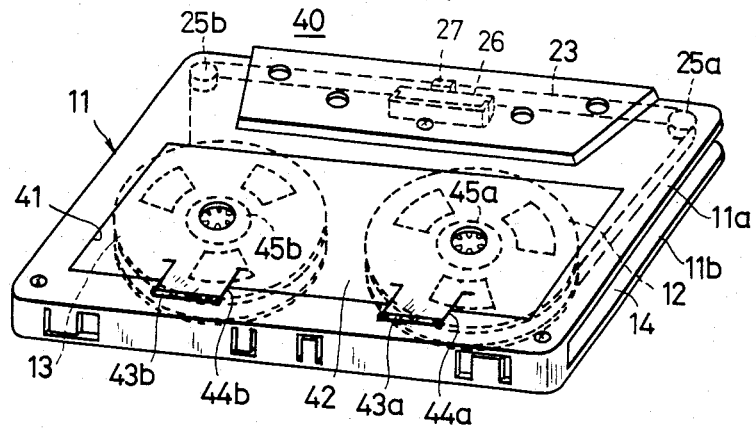
FIGS. 7A, 7B, and 7C are rear perspective views respectively showing a third embodiment, a first modification thereof, and a second modification thereof, of a tape cassette according to the present invention.

Next, description will be given with respect to a third embodiment of a tape cassette according to the present invention by referring to FIG. 7A. In FIG. 7A, those parts which are the same as those corresponding parts in FIG. 1 are designated by the same reference numerals, and their description will be omitted. In a tape cassette 40 shown in FIG. 7A, a large opening 41 is formed in the plate part 11a of the cassette case 11. A cover 42 for covering the opening 41 in its closed state, is pivotally supported by pivot supports 43a and 43b. The pivot supports 43a and 43b are loaded with respective springs 44a and 44b, and the springs 44a and 44b constantly urge the cover 42 in a closing direction. Support parts 45a and 45b which are designed to engage with the center holes in the respective reels 12 and 13, are located on the inner surface of the cover 42.

When inserting the reels 12 and 13 into the cassette case 11, the cover 42 is manually rotated upwardly and opened against the forces exerted by the springs 44a and 44b, and the reels 12 and 13 are inserted through the opening 14 from both sides of the cassette case 11 as in the embodiments described before. The cover 42 rotates downwardly and closes due to the action of the springs 44a and 44b when the cover 42 is released from the open state. In this state, the support parts 45a and 45b engage with the holes in the respective reels 12 and 13, so as to rotatably support the reels 12 and 13. Support parts are located on the plate part 11b at positions opposing the support parts 45a and 45b.

On the other hand, when removing the reels 12 and 13 from the cassette case 11, the cover 42 is rotated upwardly and opened so as to disengage the support parts 45a and 45b from the holes in the respective reels 12 and 13. Thereafter, the reels 12 and 13 are removed from the cassette 11 through the opening 14 on both sides of the cassette case 11.

Figure 7B:
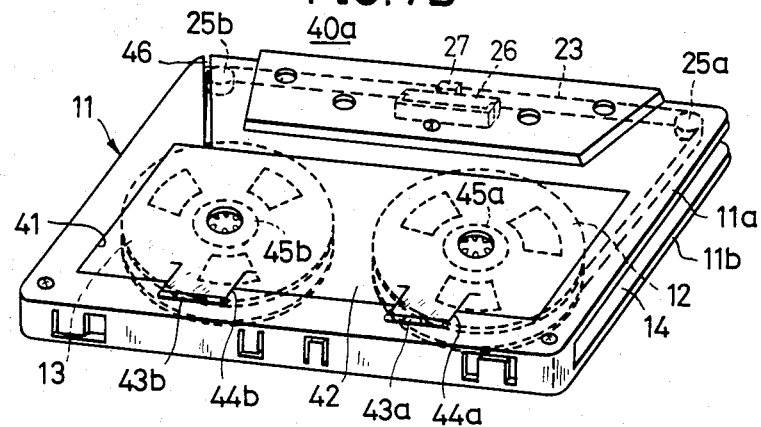

The reel 13 may be inserted into and removed from the cassette case 11, through the opening 41. A first modification of the third embodiment is shown in FIG. 7B. In FIG. 7B, a tape cassette 40a has a slit 46 formed in the plate part 11a of the cassette case 11. This slit 46 communicates with the opening 41 and the opening 14 at the front of the cassette case 11. There is no opening on the left side of the cassette case 11. According to this tape cassette 40a, the reel 13 is inserted into the cassette case 11, by upwardly rotating and opening the cover 42, and then inserting the reel 13 through the opening 41. The magnetic tape 23 is passed through the slit 46. Then, the magnetic tape 23 is manually guided along the opening 14 in the cassette case 11, and the reel 12 is inserted into the cassette case 11 through the opening 14 on the right of the cassette case 11. The cover 42 is thereafter closed so that the reels 12 and 13 are supported by the respective support parts 45a and 45b. The reels 12 and 13 can be removed from the cassette case 11, by performing the above operation in the reverse sequence.

Figure 7C:
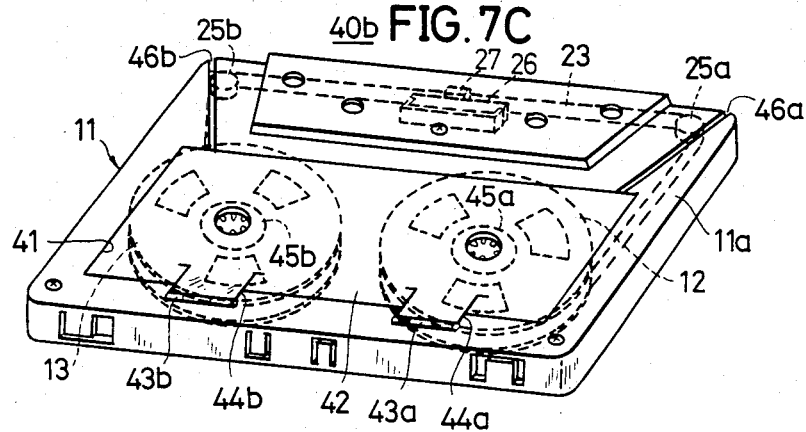

A second modification of the third embodiment is shown in FIG. 7C. In FIG. 7C, a tape cassette 40b has a pair of slits 46a and 46b formed in the plate part 11a of the cassette case 11. The slits 46a and 46b respectively communicate with the corner parts of the opening 41 and the opening 14 at the front of the cassette case 11. There are no openings on both sides of the cassette case 11, and the opening 14 is only provided at the front of the cassette case 11. According to this tape cassette 40b, the reels 12 and 13 are inserted into the cassette case 11, by upwardly rotating and opening the cover 42, and then inserting the reels 12 and 13 through the opening 41. The magnetic tape 23 is passed through the slits 46a and 46b. Then, the magnetic tape 23 is manually guided along the opening 14 in the cassette case 11. The cover 42 is thereafter closed so that the reels 12 and 13 are supported by the respective support parts 45a and 45b. The reels 12 and 13 can be removed from the cassette case 11, by performing the above operation in the reverse sequence.

Figure 8:
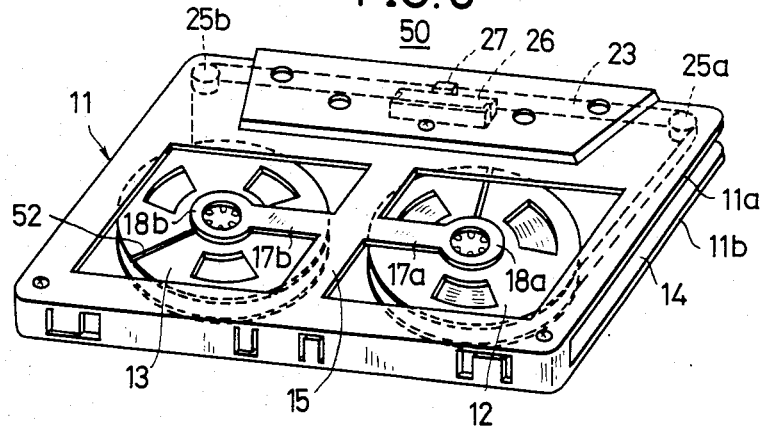
FIG. 8 is a rear perspective view showing a fourth embodiment of a tape cassette according to the present invention.

Next, description will be given with respect to a fourth embodiment of a tape cassette according to the present invention, by referring to FIGS. 8 through 10. In FIGS. 8 through 10, those parts which are the same as those corresponding parts in FIGS. 1, 3, and 5 are designated by the same reference numerals, and their description will be omitted. The cassette case 11 of a tape cassette 50, has the same shape as the cassette case 11 of the tape cassette 10 shown in FIG. 1. When inserting the reel 12 into the cassette case 11, the reel 12 having the magnetic tape 23 wound thereon is inserted into the cassette case 11 through the opening 14 on the right side of the cassette case 11 in FIG. 8, so as to be supported by the support part 18a. Then, the tip end of the magnetic tape 23 is pulled to draw the magnetic tape 23 out of the reel 12, and the magnetic tape 23 is manually guided along the front of the cassette case 11.

A pin-shaped engaging part 51 is provided at the tip end of the magnetic tape 23. A slit 52 is formed in the reel flange 21a of the reel 13. Moreover, a groove 53 which connects to the slit 52 and is parallel to the axial direction, is formed in the reel hub 20.

The part of the magnetic tape 23 in the vicinity of the tip end thereof, is inserted through the slit 52 of the empty reel 13, into a position between the reel flanges 21a and 21b. Further, the engaging part 51 is inserted from above the groove 53, to engage with the reel hub 20. The reel 13 in this state, is inserted into the cassette case 11 through the opening 14 on the left side of the cassette case in FIG. 9, to be supported by the support part 18b.

The reels 12 and 13 can be removed from the cassette case 11, by performing the operations described heretofore in the reverse sequence. According to this fourth embodiment, it is only necessary to prepare a cassette case 11 comprising one empty reel 13 with respect to a plurality of reels 12 having the magnetic tape 23 wound thereon. A desired reel 12 among the plurality of reels 12, may be used by inserting the desired reel 12 into the cassette case 11.

Next, description will be given with respect to a fifth embodiment of a tape cassette according to the present invention by referring to FIGS. 11 through 16. The cassette case 11 of a tape cassette 60, is made up of an upper half 61 and a lower half 62 which are made of a resin and are secured together by screws. The cassette case 11 of the tape cassette 60 has the same external shape and size as the cassette case of the existing compact type tape cassette. The rear and right side of the cassette case 11 in FIG. 11A, are respectively closed by a rear wall 63 and a side wall 64. The left side of the cassette case 11 is formed as the opening 14, so that the reels 12 and 13 can be inserted into and removed from the cassette case 11 through this opening 14. The openings 16a and 16b are formed in both the upper and lower halves 61 and 62 at positions opposing the respective reels 12 and 13 which are inserted into the cassette case 11 and supported.

The cassette case 11 comprises a first reel support part 67a which is made up of mutually opposing upper and lower ring-shaped parts 65a and 66a, and a second reel support part 67b which is made up of mutually opposing upper and lower ring-shaped parts 65b and 66b. The ring-shaped part 65a is located on the tip end of the arm 17a which extends to the left from the bridge 15 of the upper half 61, and the ring-shaped part 65b is located on the tip end of the arm 17b which extends to the right from the bridge 15 of the upper half 61. Similarly, the ring-shaped part 66a is located on the tip end of an arm 28a which extends to the left from the bridge 15 of the lower half 62, and the ring-shaped part 66b is located on the tip end of an arm 28b which extends to the right from the bridge 15 of the lower half 62. Lips 68a, 68b, 69a, and 69b are respectively formed on the ring-shaped parts 65a, 65b, 66a, and 66b, on the side opposite from the respective arms 17a, 17b, 28a, and 28b. As will be described later on in the specification, the user holds the ring-shaped parts 65a, 65b, 66a, and 66b by the lips 68a, 68b, 69a, and 69b, so as to resiliently deform the arms 17a, 17b, 28a, and 28b and mutually separate thr ring-shaped parts 65a and 66a and the ring-shaped parts 65b and 66b as indicated by a two-dot chain line in FIG. 14, when inserting the reels 12 and 13 into the cassette case 11.

A window 70 through which a magnetic head enters, windows 71a and 71b through which a pinch roller enters, and the like, are formed at the front of the cassette case 11. The pad 27 is provided at the inner part of the window 70. Furthermore, an opening 72 for allowing the magnetic tape 23 to enter the cassette case 11, is also formed at the front of the cassette case 11.

Figure 13D:
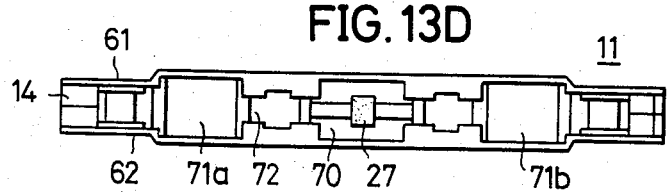
Figure 13E:
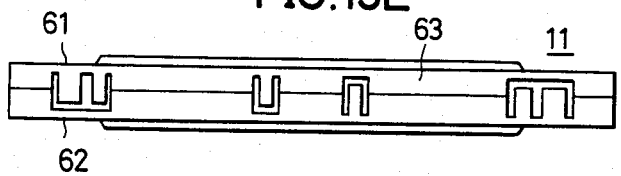
Figure 14:
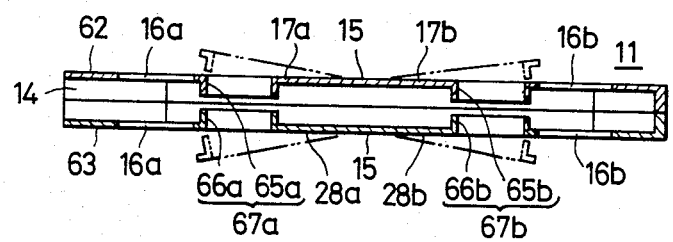
FIG. 14 is a view in cross section along a line XIV—XIV in FIG. 13A.

The narrow slit 46 through which the magnetic tape 23 is inserted when setting the magnetic tape 23 in place, is formed in the upper half 61. The slit 46 is located between the right corner part of the opening 16b, and the right side of the cassette case 11 closer to the front thereof. As shown in FIG. 13B, the width of the slit 46 is wider towards the inner part of the cassette case 11. In other words, the slit 46 has a tapered cross section.

Figures 15, 16:
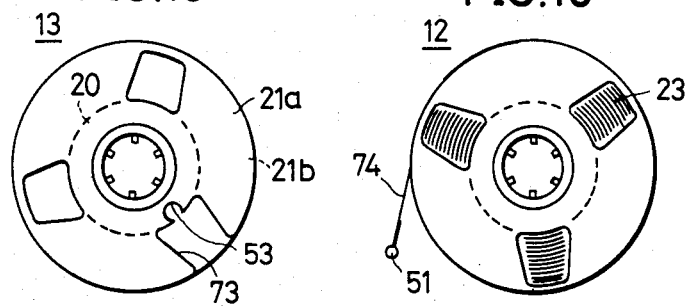
FIG. 15 is a plan view of an empty reel which is used in the tape cassette shown in FIG. 11.
FIG. 16 is a plan view showing a reel which has a magnetic tape wound thereon and is used in the tape cassette shown in FIG. 11.

The reel 13 comprises the reel hub 20 and the upper and lower reel flanges 21a and 21b, as shown in FIG. 15. A cutout 73 is open in the outer peripheral direction of the upper flange 21a. The engaging groove 53 having a circular cross section, is formed in the hub 20 at a position opposing the cutout 73.

As shown in FIG. 16, the reel 12 comprises the upper and lower reel flanges. The magnetic tape 23 and a leader tape 74 which is connected to the end of the magnetic tape 23, are wound on the reel 12. The pin-shaped engaging part 51 is located on the tip end of the leader tape 74. The pin-shaped engaging part 51 is secured on the tip end of the leader tape 74 in a state where the leader tape 74 is wrapped around the pin-shaped engaging part 51, so that the pin-shaped engaging part 51 is positively secured onto the leader tape 74. This reel 12 is normally kept in a state accommodated within a special case.

Next, description will be given with respect to the operation of inserting the empty reel 13 and the reel 12 having the magnetic tape 23 wound thereon, into the cassette case 11.

First, the empty reel 13 is inserted into the cassette case 11 through the opening 14 on the left side of the cassette case 11, to be supported by the second reel support part 67b. Then, the reel 12 is also inserted through the opening 14, to be supported by the first reel support part 67a. The reels 12 and 13 can be inserted up to the respective predetermined positions within the cassette case 11 without being interfered with by the ring-shaped parts 65a, 66a, 65b, and 66b, by manually bending the arms 17a, 28a, 17b, and 28b as indicated by the two-dot chain line in FIG. 14 so as to increase the separation between the ring-shaped parts 65a and 66a and the separation between the ring-shaped parts 65b and 66b. When the reels 12 and 13 are inserted up to the respective predetermined positions within the cassette case 11, the ring-shaped parts 65a and 66a engage the center hole of the reel 12, and the ring-shaped parts 65b and 66b engage the center hole of the reel 13. As a result, the reels 12 and 13 are rotatably supported by the respective support parts 67a and 67b.

Thereafter, the user holds the pin-shaped engaging part 51 located on the tip end of the leader tape 74, and pulls the leader tape 51 around the front of the cassette case 11 as indicated by a two-dot chain line in FIG. 11A. The leader tape 74 is inserted into the cassette case 11 through the slit 46, in a state where the leader tape 74 is perpendicular to the upper half 61. Further, the pin-shaped engaging part 51 is inserted into the engaging groove 53 of the hub 20 as shown in FIG. 11A. Accordingly, the tip end of the leader tape 74 is removably connected to the hub 20 of the reel 13. When the reel 13 is rotated in the tape take-up direction, the slack in the leader tape 74 is taken up by the hub 20, and the leader tape 74 becomes tense and enters into the opening 72. In this state, the leader tape 74 and the magnetic tape 23 form the predetermined tape path. In this predetermined tape path, the leader tape 74 and the magnetic tape 23 are drawn out of the reel 12, guided by a small-diameter guide pin 75a, pass the front of the cassette case 11 under the guidance of the guide rollers 25a and 25b, and reach the reel 13 after being guided by a small-diameter guide pin 75b. The operation of engaging the pin-shaped engaging part 51 with the engaging groove 53, and the operation of rotating the reel 13 in the tape take-up direction, can be performed with ease through the opening 16b.

The tape cassette 60 is loaded into the tape recorder in the state described above. When the tape recorded finishes playing a side "A" of the tape cassette 60, the side of the tape cassette 60 is reversed and loaded into the tape recorder so as to play a side "B" of the tape cassette 60. When the tape recorder finishes playing the side "B" of the tape cassette 60, the magnetic tape 23 is taken up by the reel 12. As a result, the tape cassette 60 assumes the state shown in FIG. 11A which is the same as the state where the reels 12 and 13 are inserted into the cassette case 11 and the magnetic tape 23 is positioned in the predetermined tape path. Hence, when playing a different magnetic tape on the tape recorder, the reel 12 is removed from the cassette case 11 and another reel having the different magnetic tape wound thereon is inserted into the cassette case 11.

When removing the reel 12 from the cassette case 11, the pin-shaped engaging part 51 is disengaged from the engaging groove 53 so as to disconnect the leader tape 74 from the reel 13. Then, the leader tape 74 is taken up by the reel 12. The reel 12 is removed from the cassette case 11 through the opening 14, in a state where the arms 17a and 28a are bent so that the center of the reel 12 is no longer supported. The other reel having the different magnetic tape wound thereon, can be inserted into the cassette case 11, and the leader tape can be pulled around the front of the cassette case 11, by performing operations similar to the operations described before.

Accordingly, it is possible to play $N$ ($N$ is an integer) reels of tape, by successively replacing the reel 12 with one of $N$ reels having diffent magnetic tapes wound thereon.

Therefore, instead of keeping $N$ compact tape cassettes, it is only necessary to keep one cassette case 11, an empty reel 13, and $N$ reels 12 having different magnetic tapes wound thereon. In other words, instead of keeping $N$ compact type tape cassettes, it is only necessary to keep essentially $N$ reels 12, and the space required to keep the reels of tape can be reduced to approximately one half or less of the space which was required heretofore.

In addition, the empty reel 13 can be removed from the cassette case 11 according to the needs, by bending the arms 17b, 28b, 17a, and 28a.

Further, the present invention is not limited to these embodiments, but various variations and modifications may be made without departing from the scope of the present invention.

What is claimed is:

1. A tape cassette comprising:
   a cassette case comprising a pair of plate parts which parts define therebetween a front opening which is located on the front of said tape cassette for allowing a tape to enter within said cassette case, and a side opening which is located on at least one side of said cassette case;
   a pair of reels for winding said tape thereon, said reels being inserted into and removed from said cassette case through said side opening without the need to open the plate parts; and
   a pair of support parts provided displaceably on at least one of said plate parts, for rotatably supporting said reels which are inserted into said cassette case, said support parts being displaced for disengagement from said reels which are being removed from said cassette case.

2. A tape cassette as claimed in claim 1 in which said cassette case comprises at least a pair of resiliently flexible arms which are integrally formed on at least one of said plate parts, said arms being displaced from their free states only in response to the application of torque, and said support parts being located on tip ends of the respective arms.

3. A tape cassette as claimed in claim 1 in which at least one of said plate parts comprises a bridge part which defines and partitions a pair of openings, and at least a pair of flexible arms which are integrally formed on said bridge part and project with the respective pair of openings, said arms being displaced from their free states only in response to the application of torque, and said support parts being located on tip ends of the respective arms.

4. A tape cassette as claimed in claim 1 in which said support parts each have a hole into which a reel driving shaft of a recording and/or reproducing apparatus enters, and a ringshaped projection which engages a center hole in the corresponding reel.

5. A tape cassette as claimed in claim 1 in which said support parts comprise a pair of mutually opposing members which lie in a plane parallel to a rotational plane of said reels.

6. A tape cassette as claimed in claim 1 in which said cassette case has said side opening on both sides thereof, and said pair of reels for winding said tape are inserted into and removed from said cassette case through the respective side openings on both sides of said cassette case.

7. A tape cassette as claimed in claim 1 in which said cassette case comprises a pair of rotary members on the ends of which said support parts are formed, said rotary members being pivotally supported on said cassette case, and further comprises a pair of urging means for urging said corresponding rotary members toward positions whereat said support parts engage said reels.

8. A tape cassette as claimed in claim 1 in which at least one of said plate parts has an opening and a slit through which said tape enters and leaves said eassette case, said slit extending from the opening to said front opening or said side opening in said cassette case.

9. A tape cassette as claimed in claim 1 in which one of said reels comprises a flange having a cutout through which said tape can engage with and disengage from said one reel, and a hub having a groove which is parallel to a rotational axis of said one reel and which communicates with said cutout, and the other reel is wound with a tape having an engaging part at one end thereof for engaging with said groove in said hub of said one reel.

10. A tape cassette as claimed in claim 9 in which said other reel is wound with a magnetic tape and a leader tape which is connected to a tip end of said magnetic tape, and said engaging part is located on a tip end of said leader tape.

* * * * *